United States Patent [19]

Allemand

[11] 3,975,639

[45] Aug. 17, 1976

[54] PARTICLE LOCALIZATION DETECTOR

[75] Inventor: Robert Allemand, Saint-Ismier, France

[73] Assignee: Commissariat a l'Energie Atomique, Paris, France

[22] Filed: Dec. 17, 1974

[21] Appl. No.: 533,474

[30] Foreign Application Priority Data

Dec. 21, 1973 France ............................ 73.46051

[52] U.S. Cl. ............................................ 250/385
[51] Int. Cl.² ............................................ G01T 1/18
[58] Field of Search ..................................... 250/385

[56] References Cited

UNITED STATES PATENTS

| | | | |
|---|---|---|---|
| 3,562,528 | 2/1971 | Joyce | 250/385 X |
| 3,654,469 | 4/1972 | Kantor | 250/385 |
| 3,703,638 | 11/1972 | Allemand et al. | 250/385 |

*Primary Examiner*—Davis L. Willis
*Attorney, Agent, or Firm*—McNenny, Pearne, Gordon, Gail, Dickinson & Schiller

[57] ABSTRACT

A proportional detector for the localization of particles comprises a leak-tight chamber filled with fluid and fitted with an electrode of a fisrt type consisting of one or more conducting wires and with an electrode of a second type consisting of one or more conducting plates having the shape of a portion of cylindrical surface and a contour which provides a one-to-one correspondence between the position of a point of the wires and the solid angle which subtends the plate at that point, means being provided for collecting the electrical signal which appears on the plates.

12 Claims, 10 Drawing Figures

PARTICLE LOCALIZATION DETECTOR

This invention relates to a detector for the localization of particles.

In more exact terms, the present invention relates to improvements in the processing of the electrical signal or signals delivered by a particle detector which permits localization of the particle beam, namely a detector of the type which contains a gaseous or liquid medium and employs the properties of operation in the proportional regime.

It is known that a detector of this type is capable of localizing charged particles ($\alpha$-particles, $\beta$-particles and the like), neutral particles (neutrons or electromagnetic radiations (X-rays, $\gamma$-rays). In particular, detectors of this type are well suited to localization of thermal neutrons (neutron diffraction) and X-radiation (X-ray diffraction) when the dectecting medium is gaseous. It is also possible to contemplate the localization of $\gamma$-radiation of fairly high energy by making use of liquid dielectrics (liquid xenon, for example).

In a conventional counter of the proportional type or in a multiwire proportional chamber, the charge multiplication zone is limited to a cylindrical space of very small thickness (a few tens of microns) around the anode wire. In this space, the electric field is sufficient to ensure that the primary electrons produced by the radiation acquire sufficient energy between two collisions to ionize fresh molecules of the gas contained within the chamber of the counter. From an electrical viewpoint, the result thereby achieved is exactly the same as if the charges were wholly produced in the immediate vicinity of the anode wire. The quantity of charge produced by electrical influence on the surrounding cathode or cathodes is therefore proportional to the solid angle subtending the cathode or cathodes from that zone of the anode wire in which the charge multiplication has taken place.

There are shown in perspective in FIG. 1 the essential parts of a multiwire particle detector of the type escribed in U.S. Pat. No. 3,703,638 filed May 22, 1970 and issued Nov. 21, 1972 in the name of COMMISSARIAT A L'ENERGIE ATOMIQUE. In its general principle, said detector permits localization in a direction X and essentially comprises a first cathode plane 2, a second cathode plane 4 constituted by the juxtaposed array of cathode strips such as the strip 6 which are electrically insulated from each other and located at right angles to the direction X. Between these two cathode planes, provision is made for wires such as anode or multiplication wires 8 for example which are parallel to the direction X. The production of electric charges takes place on these wires. The device as shown in the FIGURE permits detection in the direction X. Each cathode strip 6 is connected to an amplifier (10*a*, 10*b*, etc.) which serves to collect the electrical signal obtained by influence of the charges produced at the point A of the anode wire. There have been shown diagrammatically the pulses obtained at the output of each of the amplifiers 10*a*, 10*b*, etc . . . ($E_a$, $E_b$, $E_c$, etc.). It is readily apparent that the pulse $E_c$ corresponding to the amplifier $\mathbf{10}_c$ has the highest value since the corresponding strip 6 is nearest the point A at which the production of charges takes place. In order to localize the point of impact of the radiation (point A), it is therefore only necessary to detect among all the signals obtained at the outputs of the amplifiers $\mathbf{10}_i$ the particular signal which has the highest amplitude (in this case the signal $E_c$). If it is also desired to obtain a detection in the direction Y, the cathode plate 2 is replaced by cathode strips which are identical with the strips 6 and at right angles to these latter; the position detection in the direction Y is thus obtained by processing the signals obtained on each cathode strip. Should it be desired to have high resolution in the direction Y, provision must be made for a large number of multiplication wires 8 since the spatial resolution in the direction Y is substantially equal to the pitch of the wires 8. Localization is simultaneous at X and Y and achieved by coincidence between the two pulses of larger amplitude which are produced respectively on the two cathode strips in respect of the directions X and Y.

In the case of multidetectors for medical applications in which it serves no useful purpose to attain high spatial resolutions (a resolution of the order of 3 mm is sufficient when taking into account the performances of the collimators), this arrangement offers the advantage of being simple both from a technological and from an electronic standpoint. On the other hand, this arrangement cannot be extrapolated to detectors which have a very high spatial resolution (of the order of 300 $\mu$) since the number of measuring channels becomes prohibitive. In point of fact, there is now a real need for devices which provide high spatial resolution, in particular for the study of biological structures either by thermal neutron diffraction or by X-ray diffraction.

A number of solutions have been proposed in order to simplify the device for generating and processing electrical signals with a view to localizing the particle beam. A first solution (proposed by G. Charpak at the C.E.R.N. Conferences in 1973) consists in grouping together the outputs of several consecutive cathode strips and in determining the centroid of the set of signals obtained which correspond to a direction of detection. This solution represents a certain simplification in comparison with the means described earlier but still calls for a relatively complex treatment of he signals obtained if it is desired to achieve high resolution.

Another system proposed by Perez-Mendez consists in interposing delay lines between each output of the cathode strips which have the same direction. Measurement of the time interval which elapses between a reference pulse and the pulse of larger amplitude makes it possible to localize the point of impact in one direction. However, the capacitive coupling results in the loss of many charges and consequently in considerable weakening of the signal which is available for localization.

Another system proposed by Borkowski consists in measuring the rise time of the pulses collected at the extremities of resistive wires which are parallel to the direction of localization X but such wires are difficult to form and are extremely fragile.

This invention is precisely directed to a number of forms of construction of particle localization detectors which overcome the disadvantages mentioned in the foregoing insofar as they permit localizaion in one or two directions without entailing the need for processing systems which are complex or costly to produce.

The particle localization detector which operates in the proportional regime in accordance with the invention essentially comprises a leak-tight chamber filled with fluid and within said chamber an electrode of a first type constituted by at least one conducting wire and an electrode of a second type constituted by at least one conducting plate having the shape of a portion of cylindrical surface in which the generating-lines are parallel to the direction of the conducting wire or wires, the contour of the conducting plate or plates being such as to provide substantially a one-to-one correspondence between the position of a point of the wire or wires and the solid angle which subtends said plate at said point and means for collecting the electrical signal which appears on said plate or plates.

A clearer understanding of the invention will in any case be obtained from the following description of several embodiments of the invention which are given by way of example without any limitation being implied, reference being made to the accompanying drawings, in which:

FIG. 1 is a view in perspective showing a multidetector in accordance with the prior art as described in the foregoing;

FIG. 2*a* is a view in perspective showing the cathodes of a unidirectional detector having a single anode wire in accordance with the invention;

FIG. 2*b* is a developed view of the cathode plate of FIG. 2*a*;

Figure 1:
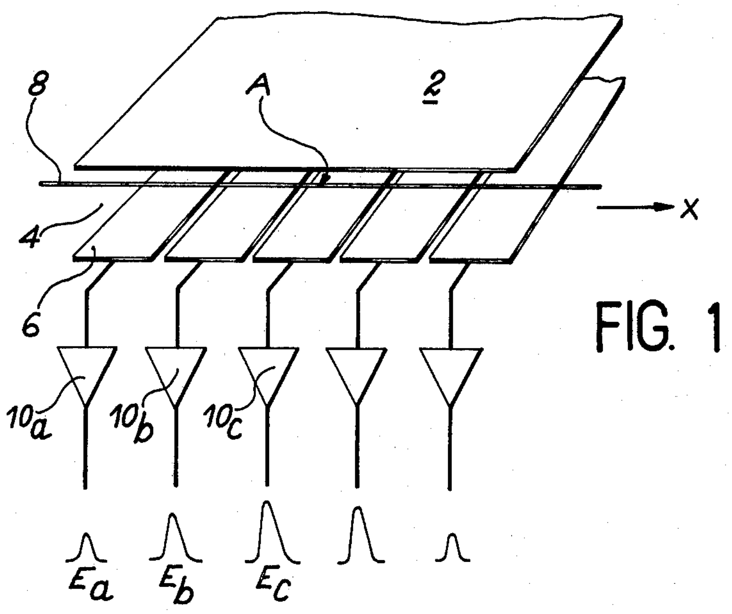
Figure 2A:
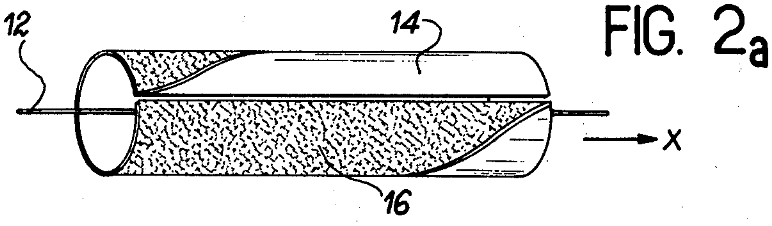
Figure 2B:
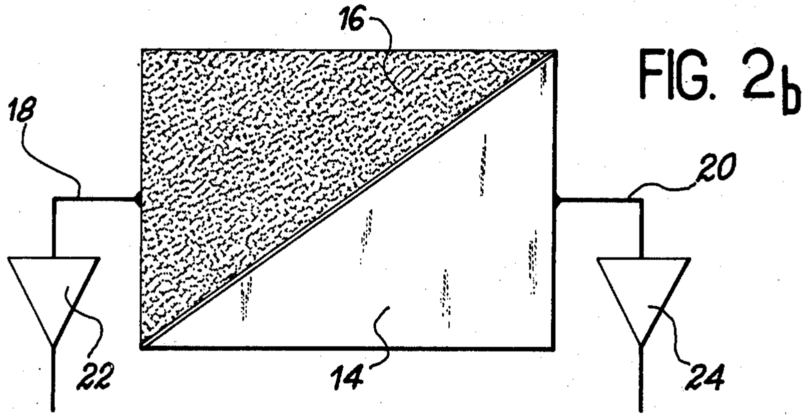
Figure 3:
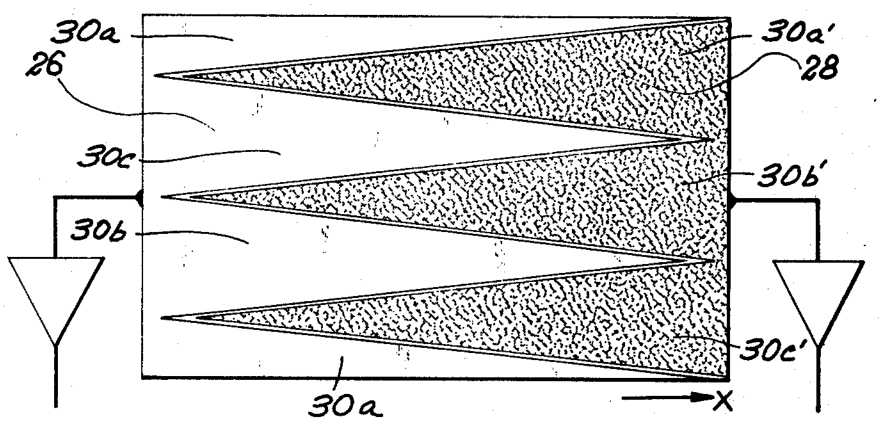
FIG. 3 is a developed view of an alternative form of construction of the cathode plate.

The invention will first be explained by considering the simplest form of construction which involves detection in a single direction X in the case in which provision is made for a single multiplication wire as illustrated in FIGS. 2*a* and 2*b* and in FIG. 3.

A detector of this type essentially comprises an anode wire or multiplication wire 12 and a cathode plate constituted by two separate plates 14 and 16. These two plates which are electrically insulated from each other are inscribed on a right circular cylinder, the axis of which coincides with the axis of the wire 12. As can more readily be seen in the developed view of FIG. 2*b* which shows both the plates 14 and 16, it is apparent that each plate is constituted by a semi-rectangle limited by a diagonal line. The plates 14 and 16 are each connected to an output wire designated respectively by the references 18 and 20; said wires each serve to drive an amplifier designated respectively by the references 22 and 24, each amplifier being intended to deliver the output signal which corresponds to each plate and the processing of which permits localization.

The amplitude of the signals $A_1$ and $A_2$ collected on each of the half-cathodes 14 and 16 is a function of the position of the charges produced at the level charges produced can be considered as total electrical influence with respect to the cathodes, it is accordingly shown that the localization in the direction X of the particle beam is proportional to the quantity $$\frac{A_1 - A_2}{A_1 + A_2},$$

that is to say:

$$x = K \frac{A_1 - A_2}{A_1 + A_2}$$

Referring now to FIG. 2*a*, it is in fact seen that, if the multiplication point on the anode wire 12 is located near the left-hand side of the figure, the cathode 16 receives practically the entire influence of the charges produced whereas the cathode 14 receives practically no influence. On the contrary, if the multiplication point is located near the right-hand side of the figure, the cathode 14 receives practically the entire influence of the charges produced. This can readily be seen by comparing the solid angles at which the cathodes 14 and 16 are subtended respectively at these points.

If for geometrical reasons (end effects, for example) the useful zone of the detector does not always correspond to a total electrical influence in the case of the charges produced at the level of the wire, the localization law can be linearized by modifying the shape of the cathodes.

It is even possible to construct a detector having only a single electrode for collecting the useful signal such as the plate 14, for example. In fact, the solid angle which subtends the plate 14 varies according to the point of the wire 12 considered. There is indeed a one-to-one correspondence between these two values and therefore between the position of the point and the intensity of the signal collected at the cathode. However, the number of charges produced during the detection of an event is variable; the observed signal which is collected cannot therefore be directly utilized in this case and must be compared with a signal which is representative of all the charges produced and can be the electrical signal collected on the anode wire, for example. In the case in which provision is made for two cathode plates, this reference signal appears at the denominator $(A_1 + A_2)$ which represents the entire quantity of charges produced. Moreover, it clearly remains essential to produce a multiplication field of revolution about the wire 12; this can accordingly be achieved by means which are separate from the electrode 14 for collecting the useful signal, for example by means of a cylindrical electrode which is used solely for this purpose.

Other forms of cathodes may be adapted in order to reduce certain defects which have either a physical or a technological origin. These defects can be a dissymmetry of distribution of charges produced by influence with respect to the axis of revolution, this dissymmetry being due to the presence of the wire and to the dissymmetrical process of te multiplication phenomenon, a defective state of surface of the wire or defective centering of this latter with respect to the cylindrical cathode. By way of example, two cathodes constituted by portions of cylinders in interfitting relation are shown in the developed view of FIG. 3. The two cathodes (namely the cathode 26 shown in white and the cathode 28 shown in grey) are constituted by sawteeth such as those designated by the references 30*a*, 30*b* and 30*c* in the case of the cathode 26 and those designated by the references 30'a, 30'b and 30'c in the case of the cathode 28. The sawteeth which correspond to the same cathode are clearly connected electrically to each other. The two cathodes are electrically insulated.

For the sake of enhanced clarity of these FIGURES, there is not shown the leak-tight cylindrical casing in which the cathodes and the anode wire are placed and which contains the gas or the liquid. This casing does not have any feature which distinguishes it from conventional counters and is designed in a manner which is evident to anyone versed in the art.

Figure 4:
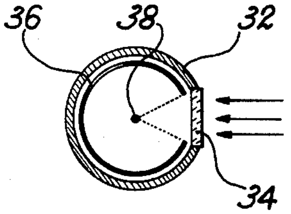
FIG. 4 is a horizontal sectional view of a unidirectional detector provided with a window.

In the cross-sectional view of FIG. 4, there is shown a cylindrical counter for the localization of nuclear radiation. The casing 32 has a longitudinal window 34 for the passage of the nuclear radiation as indicated by arrows. The set of two cathodes 36 is accordingly limited to each extremity of the window 34. The two cathodes are secured to the casing 34 for example by means of insulating supports which are not illustrated. The anode wire 38 is also shown in the figure. It is apparent that each cathode has an output conductor. The presence of the window 34 and the resultant limitation of the cathodes does not give rise to any disadvantage in regard to the localizaton. The signals collected are simply of lower strength.

For certain reasons directly related to the experiment to be performed, it may be preferable to choose a detector having a square cross-section. The device for processing the charges produced as described earlier still remains applicable. However, since each cathode element no longer corresponds to the same solid angle subtended by the wire (no symmetry of revolution), it is necessary to choose a pitch $p$ between each cathode pattern (sawtooth, for example) which is sufficiently small to ensure that localization takes place in accordance with the law which was given earlier. In any case it is always possible to carry out a correction of address by processing information collected from each cathode since this is a case of systematic errors.

Figure 5:
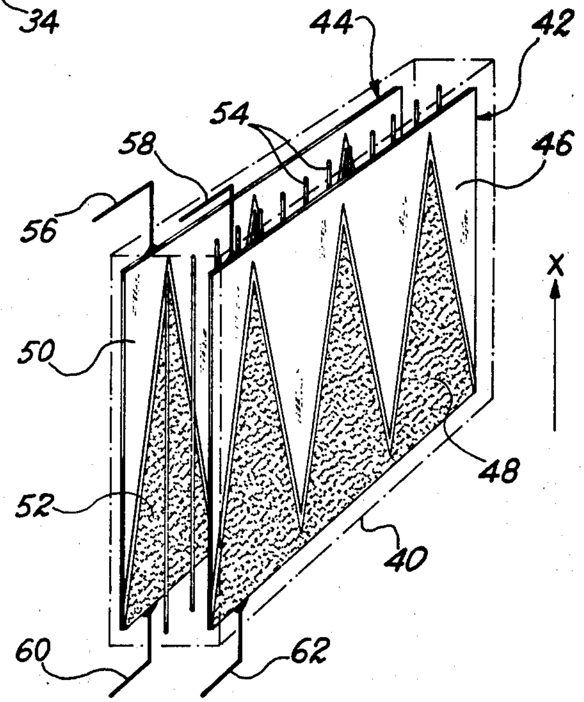
FIG. 5 is a view in perspective showing a flat multiwire detector having a single direction of localization.

There is shown in FIG. 5 one form of construction of a flat multiwire detector for the localization of the particle beam in the direction X. The detector casing 40 is shown in chain-dotted lines. The cathode assembly is constituted by two parallel plates 42 and 44. Each plate comprises two insulated half-cathodes 46 and 48 in the case of the plate 42 and two half-cathodes 50 and 52 in the case of the plate 44. Each half-cathode is constituted by sawteeth interengaged in the sawteeth of the other half-cathode as has already been described in connection with FIG. 3. There is placed at a point located half-way between these two plates and in parallel relation to these latter an array of uniformly spaced anode wires such as the wire 54. The output wires 58 and 56 of the half-cathodes 46 and 50 are connected together so as to deliver the signal $A_1$. Similarly the output wires 60 and 62 of the half-cathodes 48 and 52 are connected together so as to deliver the signal $A_2$. The process which has already been described in the foregoing is applied to the signals $A_1$ and $A_2$.

Figure 6:
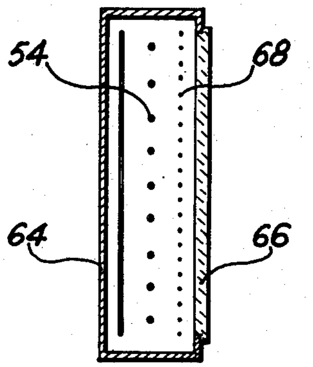
FIG. 6 is a vertical sectional view of a multiwire detector which has one direction of localization and is provided with an entrance window.

Should it be desired to localize "soft" X-rays, the detector has the structure shown in FIG. 6. The casing 64 is provided in one of its faces with a window 66. The cathode plate 42 of FIG. 5 which would have obstructed the window is replaced by an array of cathode wires 68 which are parallel to the anode wires 54. The cathode plate 44 remains unchanged and still comprises the two half-cathodes 50 and 52 which deliver the signals $A_1$ and $A_2$. It is preferable in this case to choose a pitch $p$ between each (sawtooth) pattern of the half-cathodes which is sufficiently small to ensure that localization takes place in accordance with the law defined earlier.

Figure 7:
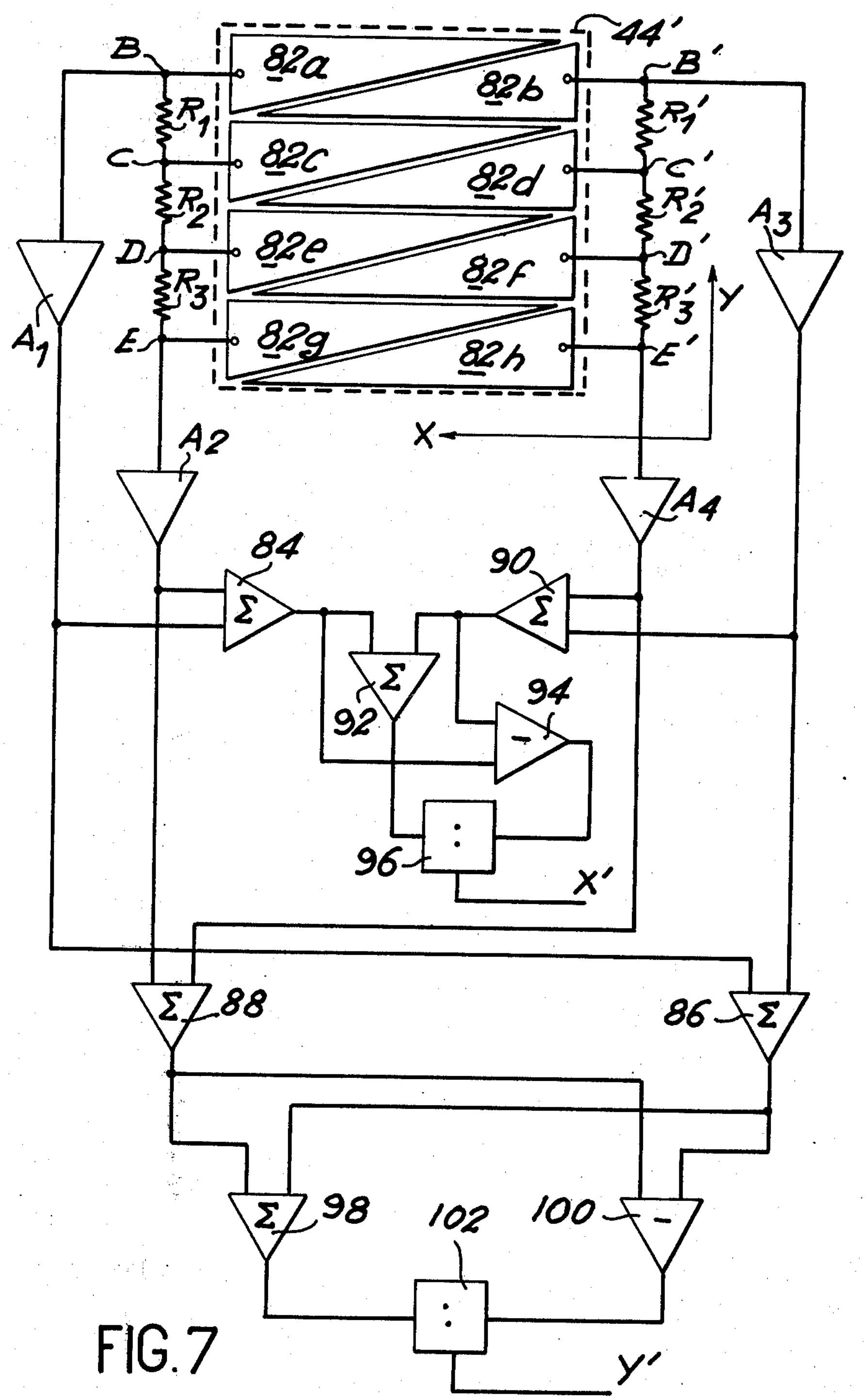
FIG. 7 is a view of an alternative form of construction of a cathode.

In the same case of utilization localization can be obtained in two orthogonal directions X and Y by substituting the cathode plate 44' shown in FIG. 7 for the cathode plate 44. The plate 44' is constituted by a plurality of conductive right-angled triangles 82a, 82b . . . 82h (eight in the example shown) which are electrically insulated from each other. To this end, it is possible by way of example to employ an insulating support on which is deposited a metallic spray-coating which forms the triangles.

The short sides of the triangles 82a, 82c, 82e and 82g respectively are connected electrically to the points B, C, D and E which are connected to each other through the identical resistors $R_1$, $R_2$ and $R_3$. These triangles form a first half-cathode.

Similarly the short sides of the triangles 82b, 82d, 82f and 82h are connected electrically to the points B', C', D' and E' and these triangles form a second half-cathode.

The points B', C', D' and E' are connected to each other through the identical resistors $R'_1$, $R'_2$ and $R'_3$. The points B, E, B' and E' are connected respectively to the amplifiers $A_1$, $A_2$, $A_3$ and $A_4$. The amplifier $A_1$ is connected to the input of the summing device 84 and of the summing device 86.

The amplifier $A_2$ is connected to the summing device 84 and to the summing device 88. The amplifier $A_3$ is connected to the summing devices 86 and 90 whilst the amplifier $A_4$ is connected to the summing devices 90 and 88. The outputs of the summing devices 84 and 90 are connected to the inputs of the summing device 92 and of the subtracting device 94. At the output of the summing device 92, there appears a signal $X_1 = (A_1 + A_2) + (A_3 + A_4)$ if the electrical signals delivered respectively by the amplifiers which bear the same references are designated as $A_1$, $A_2$, $A_3$ and $A_4$. There is obtained at the output of the subtracting device 94 the signal $X_2 = (A_1 + A_2) - (A_3 + A_4)$.

These two signals are introduced into a first divider 96 which delivers the signal $X' = X_2/X_1$. This signal X' gives the position of the point of impact in the direction X. The same treatment is applied to the signals delivered by the summing devices 88 and 86. The summing device 98 delivers a signal: $Y_1 = (A_1 + A_3) + (A_2 + A_4)$ and the subtracting device 100 delivers a signal $Y_2 = (A_1 + A_3) - (A_2 + A_4)$. The divider 102 therefore delivers the signal $Y' = Y_2/Y_1$, which gives the position of the point of impact in the direction $Y$.

Figure 9:
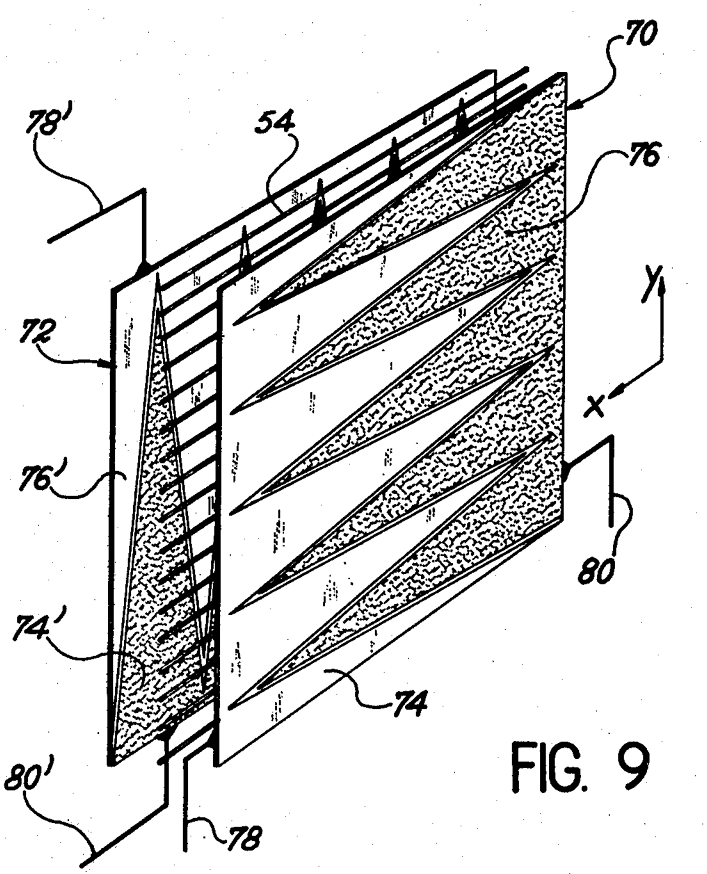
FIG. 9 is a view in perspective showing a flat multiwire detector having two directions of localization.

In FIG. 9, there is shown one example of construction of a detector in accordance with the invention for performing a localization of particles in the orthogonal directions $X$ and $Y$.

The detector obviously has a rectangular casing which contains a gas or a liquid and which has been omitted from the figure for the sake of enhanced clarity.

The detector comprises two parallel cathodes 70 and 72 between which are stretched parallel anode wires 54 forming an array which is parallel to the plates 70 and 72. The plate 70 serves to carry out the localization in the direction X. Said plate is constituted by two half-cathodes 74 and 76 which are electrically insulated from each other and have patterns in the form of interengaged sawteeth as shown in FIG. 5, the sawteeth of one and the same half-cathode being connected electrically to each other. The sawteeth are parallel to the anode wires 54. The plate 72 is identical with the plate 70 and half-cathodes 74' and 76' but is employed for localizationn in the direction Y, with the result that the sawteeth are perpendicular to the anode wires 54.

The signals delivered at the outputs 78 and 80 of the half-cathodes 74 and 76 are processed in the manner which has been mentioned in the foregoing in order to provide localization at X. The same applies to the signals delivered at the outputs 78' and 80' which provide localization at Y after processing. The sum of the signals collected at the four outputs can be employed as reference signal.

Figure 8:
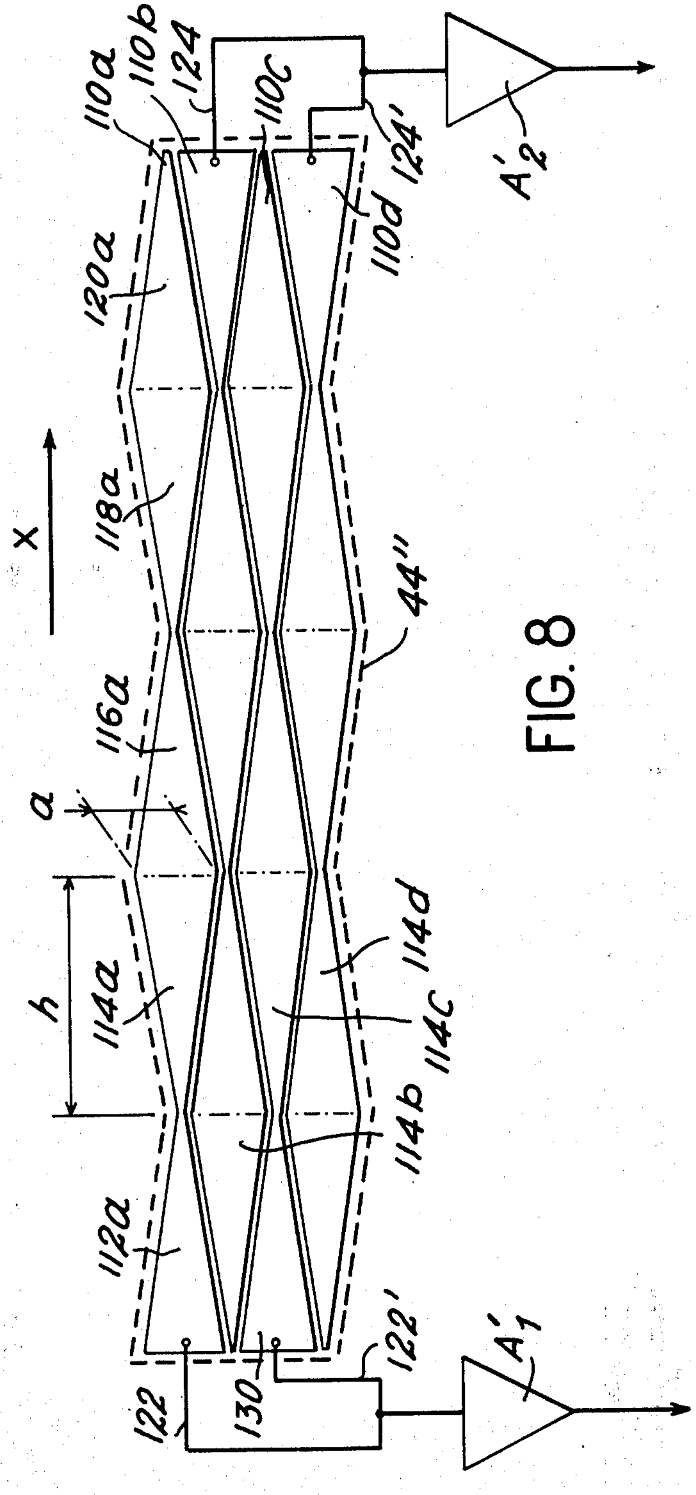
FIG. 8 is a view of another form of construction of a cathode for the detection in one direction.

There is shown in FIG. 8 another form of construction of a localizaton cathode plate. In this alternative form, the cathode plate 44'' is constituted by a plurality of conducting strips $\mathbf{110}_a$, $\mathbf{110}_b$, $\mathbf{110}_c$, $\mathbf{110}_d$ (provision could clearly be made for a larger number of strips) which are electrically insulated from each other. Each strip is constituted by elementary conducting isosceles triangles which are joined to each other.

All the triangles aforesaid are equal and have, for example, a height $h$ and a short side having a length $a$. As can be seen from FIG. 8, the short side of a triangle (for example the triangle 114*a*) is joined to the short side of one of the adjacent triangles (116*a*) whilst the apex of said triangle is joined to the apex of the adjacent second triangle (112*a*). The second strip (110*b*) has exactly the same structure as the strip 110*a* (triangles 112*b*, 114*b*, 116*b*, 118*b*, 120*b*). However, the triangle of the first strip and the triangle of the second strip which are both designated by the same reference are placed in head-to-tail relation.

The strip 110*c* is identical with the strip 110*a* and the strip 110*d* is identical with the strip 110*b*. The strips 110*a* and 110*c* are connected electrically to the amplifier $A'_1$ by means of the conductors 122 and 122'. Similarly the strips 110*b* and 110*d* are connected electrically to the amplifier $A'_2$ by means of the conductors 124 and 124'.

If consideration is given to the triangles which are placed in different strips but within the same column (triangles which have the same reference), the structure is found to be the same as in FIG. 5. For example, the triangles 114*a* and 114*c* perform the same function as the half-cathode 46 and the triangles 114*b* and 114*d* perform the same function as the half-cathode 48.

In consequence, if the signal $$Z = \frac{A'_1 - A'_2}{A'_1 + A'_2}$$

is generated, said signal $Z$ gives the positon of impact in the direction $X$ in which the origin is not the left-hand edge 130 of the cathode but the left-hand edge of a column of triangles. It is therefore necessary to determine the column concerned by another means. By employing both the number of the column (the method adopted will be explained hereinafter) and the abscissa of the point of impact (direction X) with respect to the left-hand edge of said column, the position of the point of impact in the direction X is perfectly determined.

In order to detect the number of the column concerned, it is possible by way of example to employ the anode wires which are placed at right angles to the strips.

All the anode wires which are located opposite to any given column are connected to each other. The order of the group of anode wires on which the maximum electrical signal is collected gives at the same time the number of the column which has experienced the impact.

It is readily apparent that the shapes of the cathodes or of the half-cathodes are not limited in any sense to those which have been described in the foregoing. In particular, consideration could very readily be given to half-cathodes having the shape of sawteeth in which the edges are not rectilinear but curved in order to compensate for the edge effects at each end of the cathode plates.

It is also self-evident that the orientation of the anode wires with respect to the half-cathodes is unimportant; these wires can be parallel, perpendicular or oblique with respect to the direction of the half-cathodes, an arrangement in which the wires are placed at an angle of 45° being particularly advantageous.

What we claim is:

1. A particle localizaton detector which operates in the proportional regime, wherein said detector comprises a leak-tight chamber filled with a fluid and within said chamber an electrode of a first type constituted by at least one conducting wire and an electrode of a second type constituted by at least one conducting plate having the shape of a portion of a cylindrical surface having generating-lines which are parallel to the direction of said conducting wire, the contour of said conducting plate being such as to provide substantially a one-to-one correspondence between the position of a point of said wire and the solid angle which subtends said plate at said point and means for collecting the electrical signal which appears on said plate.

2. A detector according to claim 1, wherein said electrode of the first type is constituted by a single conducting wire and said electrode of the second type is constituted by two conducting plates insulated from each other and inscribed on said cylindrical surface having a circular cross-section and being coaxial with said conducting wire, each plate having an area which is defined by a diagonal line of said cylindrical surface when developed.

3. A detector according to claim 1, wherein said electrode of the first type is constituted by a single conducting wire and wherein said electrode of the second type is constituted by two conducting plates electrically insulated from each other and inscribed on said cylindrical surface having a circular cross-section and coaxial with said conducting wire, each plate having an area defined by a broken line having the shape of successive sawteeth, said sawteeth being parallel to said conducting wire.

4. A detector according to claim 3, wherein said leak-tight chamber of said detector has a longitudinal chamber window formed of material which is permeable to X-rays, said cylindrical surface having a corresponding longitudinal cathode window area parallel and adjacent to said chamber window.

5. A detector according to claim 3, wherein the sawteeth having a length substantially equal to that of the portion of plate which constitutes each half-cathode.

6. A particle localization detector which operates in the proportional regime, wherein said detector comprises a leak-tight chamber filled with a fluid and within said chamber an electrode of a first type constituted by at least one conducting wire and an electrode of a second type constituted by at least one conducting plate having the shape of a portion of a plane surface parallel to the direction of said conducting wire, the contour of said conducting plate being such as to provide substantially a one-to-one correspondence between the position of a point of said wire and the solid angle which subtends said plate at said point and means for collecting the electrical signal which appears on said plate.

7. A detector according to claim 6, wherein the electrode of the first type is constituted by a plurality of parallel conducting wires located in the same plane and wherein the electrode of the second type is consituted by two sets of two half-cathodes, each set of half-cathodes being inscribed in a plane parallel to the plane of said wires, each half-cathode having the shape of a portion of a flat rectangular plate, said two half-cathodes each having an area defined by a broken line having the shape of successive sawteeth, said two half-cathodes of a given set being electrically insulated from each other.

8. A detector according to claim 7 wherein said sawteeth have a length substantially equal to the portion of said plate which constitutes each half-cathode.

9. A detector according to claim 6, wherein said electrode of the first type is constituted by a plurality of parallel coplanar conducting wires and wherein said electrode of the second type is constituted by a plurality of parallel coplanar conducting wires which are parallel to the plane of said electrode of the first type and placed on a first side of said electrode of the first type and by two half-cathodes inscribed in a plane parallel to the plane of said electrode of the first type, each half-cathode having the shape of a portion of a flat rectangular plate, said two half-cathodes each having an area defined by a broken line having the shape of successive sawteeth, said two half-cathodes of a given set being electrically insulated from each other.

10. A detector according to claim 9 wherein said sawteeth have a length substantially equal to the portion of said plate which constitutes each half-cathode.

11. A detector according to claim 6, wherein said electrode of the first type is constituted by a plurality of parallel coplanar conducting wires and wherein said electrode of the second type is constituted by a plurality of parallel coplanar conducting wires which are parallel to the plane of the electrode of the first type and plced on a first side of the electrode of the first type and by two half-cathodes inscribed in a plane parallel to the plane of the electrode of the first type, each half-cathode being constituted by *n* conducting right-angled triangles insulated from each other, the hypotenuse of each triangle of a half-cathode being adjacent to the hypotenuse of one of the two adjacent triangles of the other half-cathode and the long side of the right angle of said half-cathode being adjacent to the long side of the right angle of the second adjacent triangle which forms part of said other half-cathode and wherein said detector further comprises two arrays of $n - 1$ equal resistors mounted in series, each extremity of each array of resistors being connected to an amplifier, the short sides of the triangles of a given half-cathode being connected electrically to the point of connection of two consecutive resistors of a given array of resistors.

12. A detector according to claim 6, wherein the electrode of the first type is constituted by a plurality of parallel coplanar conducting wires and wherein the electrode of the second type comprises at least two half-cathodes disposed on the same plane parallel to said wires, each half-cathode being constituted by a plurality of conducting strips insulated from each other, one strip corresponding to one half-cathode being located between two strips corresponding to the second half-cathode, each strip being constituted by a succession of aligned conducting isosceles triangles joined together alternately at the apices and along the short sides thereof, all the strips corresponding to a given half-cathode being connected at one end to the same amplifier.

* * * * *

UNITED STATES PATENT OFFICE

CERTIFICATE OF CORRECTION

Patent No. 3,975,639 Dated August 17, 1976

Inventor(s) Robert Allemand

It is certified that error appears in the above-identified patent and that said Letters Patent are hereby corrected as shown below:

In the Abstract line 3, change "fisrt" to --first--.

Column 1, line 40, change "escribed" to --described--.

Column 2, line 40, change "he" to --the--.

Column 2, line 60, change "localizaion" to --localization--.

Column 3, line 65, after "level" add --of the wire 12 along the axis X. In particular, if the--.

Column 4, line 59, change "te" to --the--.

Column 7, line 5, change "localizationn" to --localization--.

Column 8, line 22, change "localizaton" to --localization--.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*